United States Patent [19]
Dailey et al.

[11] Patent Number: 5,518,109
[45] Date of Patent: May 21, 1996

[54] CONVEYOR DRIVE APPARATUS

[75] Inventors: R. Scott Dailey, Destrehan; Michael R. Straight, Luling, both of La.

[73] Assignee: The Laitram Corporation, Harahan, La.

[21] Appl. No.: 300,392

[22] Filed: Sep. 2, 1994

[51] Int. Cl.$^6$ ................................................ B65G 23/06
[52] U.S. Cl. .......................... 198/834; 403/1; 403/356; 403/362; 474/157; 474/903
[58] Field of Search ............................. 198/834; 403/1, 403/356, 362; 474/156, 157, 164, 903

[56]  References Cited

U.S. PATENT DOCUMENTS

| | | | |
|---|---|---|---|
| 1,612,769 | 12/1926 | O'Connell | 403/356 |
| 1,790,297 | 1/1931 | Alger | 198/834 |
| 5,037,356 | 8/1991 | Gladczak et al. | 474/95 |
| 5,213,001 | 5/1993 | Gruettner et al. | 74/451 |

*Primary Examiner*—Joseph E. Valenza
*Attorney, Agent, or Firm*—James T. Cronvich

[57]  ABSTRACT

A conveyor drive apparatus comprising a shaft having sprockets mounted thereon for rotation with the shafts. A conveyor belt is engaged by the sprockets. A key includes a body shaped to fit loosely in a groove along the length of the outer surface of the shaft. The key further includes a force-applying member disposed on the body for applying a force against the shaft and pressing the body against the sprocket to lock it in position on the shaft. The sprocket can further have a slot through its central bore wall in which part of the key can reside to rotate the drive member with the shaft.

19 Claims, 3 Drawing Sheets

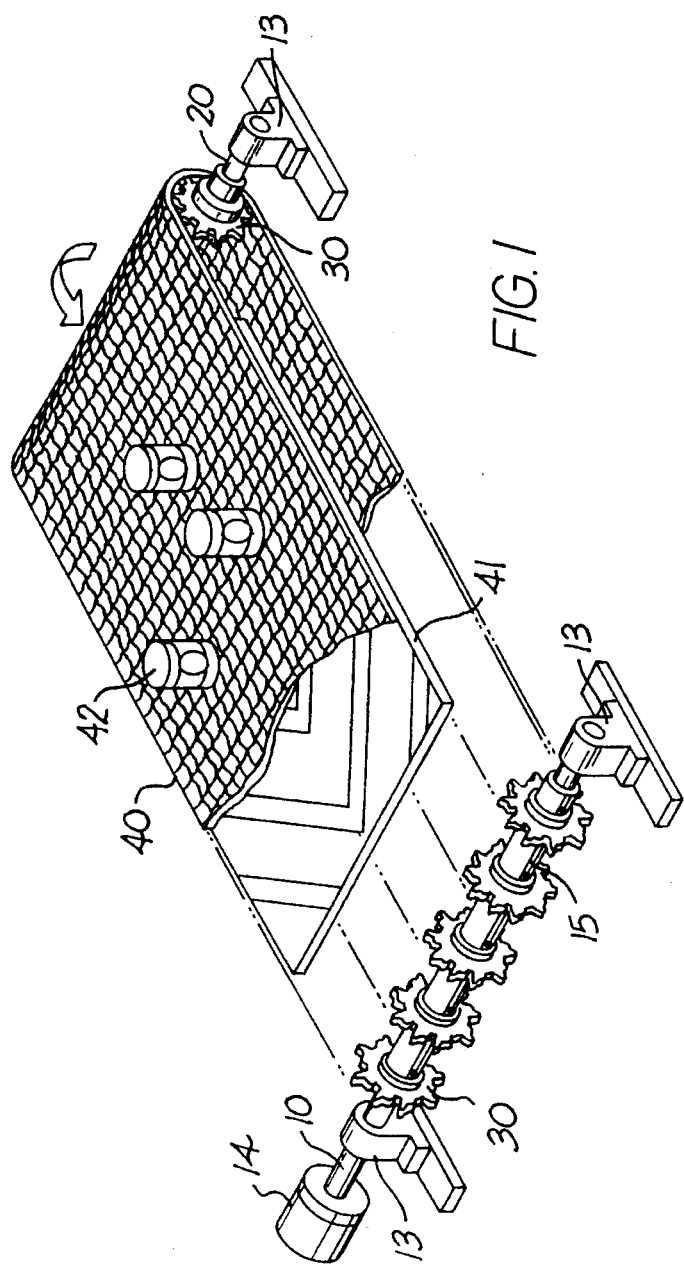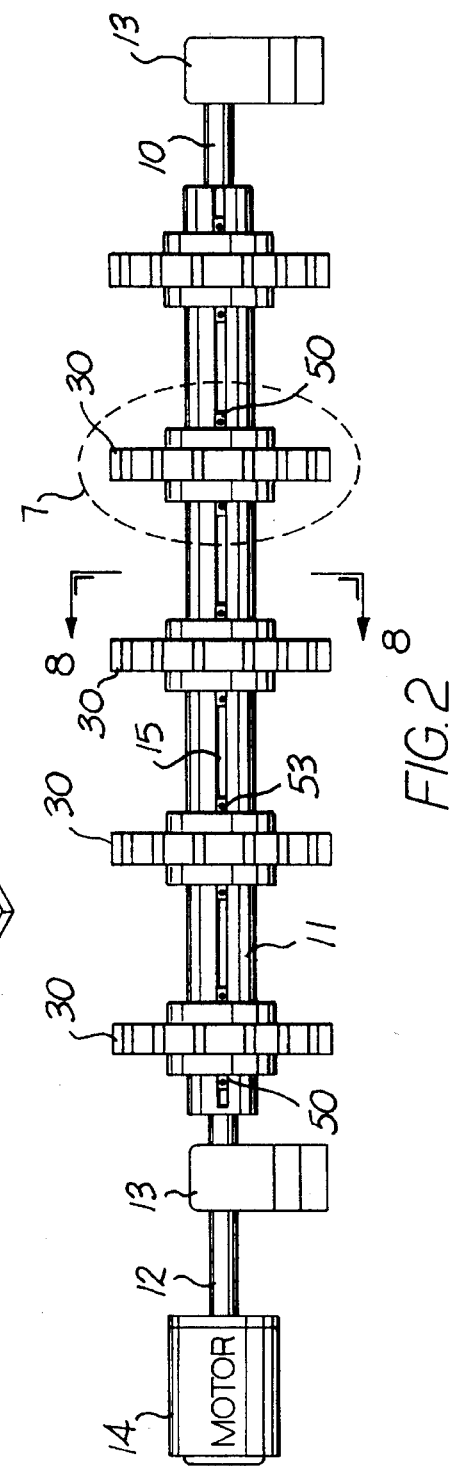

CONVEYOR DRIVE APPARATUS

BACKGROUND

The invention relates to conveyors and, more particularly, to apparatus for driving a conveyor belt by means of rotating drive members such as sprockets.

In a wide variety of industries, it is common to transport goods within a factory on a modular conveyor belt formed of a plurality of interfitting plastic modules. Modular belts of any desired length or width can be fashioned by using a suitable number of modules. The modules include recesses sized to engage the teeth of sprockets mounted on shafts at one or more locations along the belt path. The belt is driven along its path by rotation of the sprockets.

Typically, a plurality of sprockets are mounted on a shaft in parallel, with each sprocket engaging the conveyor belt at a different location along the width of the belt. At least one of the sprockets is secured to the shaft to prevent lateral movement of the sprocket. The other sprockets are free to slide, or float, laterally along the shaft. The one or more fixed sprockets provide for proper alignment of the conveyor belt, while the floating sprockets can move along the shaft as the width of the conveyor belt varies with temperature and age. Allowing some of the sprockets to float eliminates stresses that would be produced in the belt if all the sprockets were fixed in place and also prevents the teeth of the sprockets from slipping out of mating engagement with the recesses of the belt.

Various arrangements are used in conventional conveyors to attach sprockets to a shaft. In some cases, sprockets are retained in position by C-rings snapped into individual circumferential grooves on each side of a sprocket. The precut grooves limit the positioning of sprockets to set axial positions along the shaft. Sprockets with circular bores for use on circular shafts are often used to drive conveyor belts. Frequently, the round shafts have an axial groove cut along the shaft to form a keyway to register a mating key extending from the sprocket into its circular bore. The engaged surfaces of the keyway and the key transmit the driving force from the shaft to the sprocket. Instead of having a keyway along the shaft, many conveyor systems have a raised key disposed axially along the outside of the shaft. A groove is formed along the bore wall of the sprocket to mate with the raised key in a driving engagement. In both of these arrangements, bolts or screws are often used to hold the sprockets in place. Screws through hub portions of a sprocket or through separate hub elements are tightened against the shaft to secure the sprocket in place. Because of the need to tighten the screw sufficiently to prevent the sprocket from coming loose, it is common, especially with plastic sprockets, for the threads of the screw hole through the sprocket to strip. Once the threads are stripped, the screw can fall out and contaminate the product, as well as free the sprocket from engagement with the shaft. Consequently, there is a need for a conveyor apparatus that has sprockets registered in driving engagement with a conveyor belt and able to float axially along the shaft or to be adjusted to any position along the shaft and secured there tightly.

SUMMARY

These needs are satisfied by a conveyor apparatus having features of the present invention, which includes first and second rotatable shafts, a plurality of drive members, such as sprockets mounted on the shafts and rotating with the shaft, and an endless conveyor belt extending around and engaged by the drive members. At least the first shaft has a groove, or keyway, along the length of its outer surface. At least one of the drive members on the first shaft has a central bore wall defining a bore extending through the drive member from one side to the other to accommodate the shaft. A key having a body shaped to fit loosely in the groove also comprises a force-applying member disposed on the body for applying a force against the shaft and pressing the body against the drive member to prevent movement of the drive member and the body along the shaft.

A drive member can be secured to the shaft at any desired position by means of a drive apparatus for a conveyor according to the invention. The drive apparatus includes a rotatable shaft grooved along the length of its outer surface and a drive member for transmitting a drive force between the shaft and a conveyor belt. The drive member has a central bore wall defining a bore extending from one side of the drive member to the other to accommodate the shaft. A key having a body shaped to fit loosely in the slot also comprises a force-applying member disposed on the body of the key that can apply a force against the shaft and press the body against the drive member to prevent the key from sliding axially along the shaft.

With the force-applying member adjusted to exert zero force against the shalt, the body of the key and the drive member are free to slide along the shaft. The key can further include a draghand member disposed on the body for engaging the drive member as it moves along the shalt. In this way, as the drive member slides along the shalt, one or the other side of the drive member engages the draghand member so that the key is dragged along the shalt with the drive member. With the force-applying member adjusted to exert a maximum force against the shaft, the key is secured to the shalt and stop members disposed on the body engage the sides of the drive member to restrict the lateral movement of the drive member along the body.

In preferred versions, the key is a parallelepipedic bar longer than the length of the bore. Threaded holes extending through each end of the bar are engaged by set screws that can be tightened to exert an adjustable force against the bottom of the groove, or keyway, elevating the bar outwardly in the keyway and inwardly in a slot formed by the bore wall of the drive member to press against the drive member and prevent it from moving axially along the shaft The set screws can also be loosened to exert zero force on the shalt so that the drive member and the body of the key are free to float. The ends of the set screws extending out of the bar serve as draghand members that catch the sides of the drive member as it slides along the shalt and drag the key along with the drive member. With each hole threaded only partly along its length, the set screws are captivated against backing out and being lost or falling into conveyed. product.

DRAWINGS

These and other features, aspects, and advantages of the invention are better understood by reference to the following description, appended claims, and accompanying drawings, in which:

FIG. 1 is a broken-away perspective view of one version of a conveyor apparatus according to the invention;

FIG. 2 is a front elevation view of the drive apparatus version of FIG. 1;

DESCRIPTION

Figure 3:
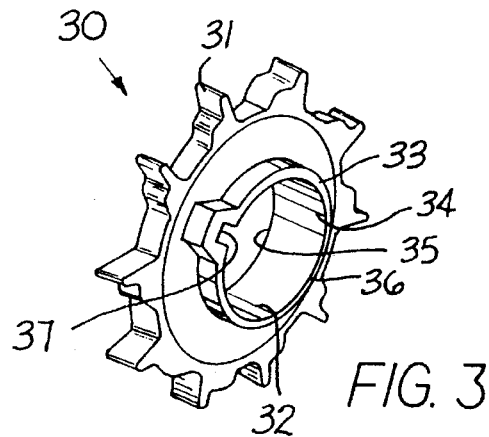
FIG. 3 is a perspective view of one version of sprocket used in the conveyor apparatus of FIG. 1.

An exemplary version of the conveyor apparatus having features of the invention is shown in FIGS. 1 and 2. The apparatus includes a rotatable drive shaft 10, a rotatable idler shaft 20, and a conveyor belt 40 forming an endless loop around the shafts. A plurality of drive members in the form of sprockets 30 for transmitting force between the shafts 10, 20 and the conveyor belt 40 are mounted on the shafts and rotate with the shafts. The sprockets 30 on the drive shaft 10 function as drive sprockets and transmit drive force from the rotating drive shaft to the belt 40. The sprockets 30 on the idler shaft 20 function as driven sprockets transmitting energy from the belt 40 to the idler shaft, Items to be conveyed, such as canned goods 42, are transported by movement of the belt 40 along the loop.

Other devices, such as rollers or wheels, can be used instead of sprockets 30 as drive members for the belt 40. In many applications, however, sprockets are preferred because the engagement of the sprocket teeth 31 with the belt 40 provides positive tracking without lateral belt slippage.

The conveyor belt can be any type of belt capable of being driven by engagement with the sprocket 30. An example of a suitable belt is a modular plastic belt such as that sold by Intralox, Inc. of Harahan, La. Such a belt has a plurality of modules interlocked by pivot pins, which enable the belt to articulate about the sprockets by pivoting between consecutive rows of modules. Parallel rows of holes are formed in the undersides of the modules for engagement with the sprocket 30. The material of which the belt 40 is made can be chosen based on the conditions under which it is used and the characteristics of the items to be transported. Modular belts are frequently made from plastics such as polypropylene, polyethylene, polyurethane, acetal, and nylon, but they may be made of metal, for example.

The drive and idler sprockets 30 may be identical. Each sprocket 30 has a plurality of teeth 31 on its periphery to mate with the holes in the underside of the conveyor belt 40. The sprockets 30 can be metal or plastic or a combination of both. Each sprocket 30 can be a one-piece member, such as formed by casting, molding, or machining, or it may comprise two or more sections detachably secured to one another.

As shown in FIG. 3, each sprocket 30 has a bore 32 at its center sized to surround a similarly shaped portion of the shaft 10, 20. To give each sprocket 30 stability and strength, one or more hollow side flanges 33 can be molded, for example, to the sprocket to form a bore wall 34 through the flanges and the central portion of the sprocket. The bore 32 thus extends through the flanges 33 from a first side 35 to a second side 36. The shape of the outer surface of the shaft 10, 20 and the similar shape of the bore 32 are not critical. For example, they may be round or square, as is most common, polygonal, or irregular. Additional advantages of the invention apply to conveyor systems having round shafts. Consequently, round shafts appear in the version of the apparatus described in detail herein. Each shaft 10, 20, as shown in the version of FIGS. 1 and 2, has a central portion 11 having a circular cross-section supporting the sprockets 30 through their cylindrical bores 32. The ends 12 of each shaft 10, 20 are also circular in cross-section and are rotatably supported by bearings 13. The drive shaft 10 is rotated about its axis by a drive source, such as an electric motor 14. The apparatus may include a conventional mechanism, such as screws that can be turned to adjust the distance between the shafts, for adjusting the tension in the belt 40. A rigid plate 41 may be disposed between the upper or load-carrying surface portion of the belt 40 to support the weight of the load-carrying portion and the transported objects 42.

Figure 4:
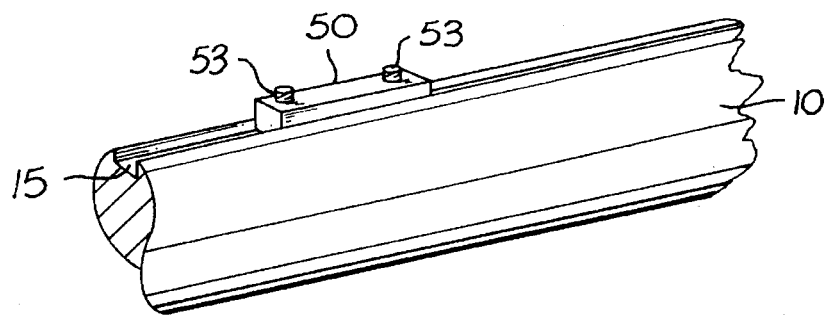
FIG. 4 is a partial perspective view of a shaft of FIG. 1 with sprockets not shown.
Figure 5:
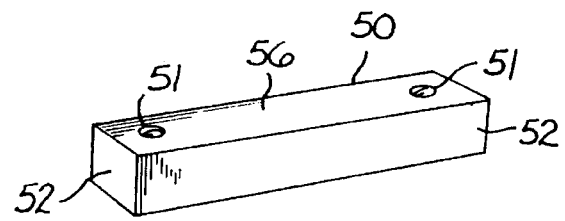
FIG. 5 is a perspective view of one of the locking keys of FIG. 1.
Figure 6A:
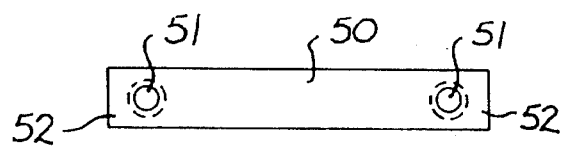
FIG. 6A is a plan view of the locking key of FIG. 5.
Figure 6B:
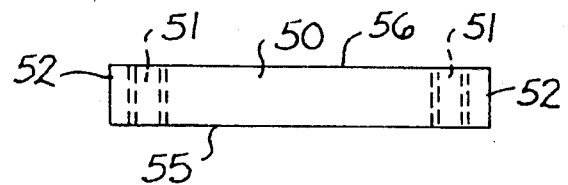
FIG. 6B is a front elevational view of the locking key of FIG. 5.

Although the following description specifically refers to the drive shaft 10, it could apply equally to the driven idler shaft 20. The round drive shaft 10, as shown in more detail in FIG. 4, includes an axial groove 15 extending along all or part of the length of the central portion 11 of the shaft 10. A key, shown in this version as a body in the shape of a parallelepipedic bar, fits in the groove 15, which serves as a keyway. The outer dimensions of the key 50 are less than the dimensions of the mating groove 15 so that the key fits loosely and can slide along the shaft 10. In the preferred version shown in FIG. 2, the groove 15 extends only partly along the central portion 11 of the shaft 10 so that the keys cannot slide off the shaft. The bores 32 in the sprockets 30 are slightly larger than the outer dimensions of the central portion 11 of the shaft 10 so that the sprockets fit loosely to permit their axial movement along the shaft. A slot 37 is formed by the bore wall 34 of the sprocket 30. The slot 37 extends the length of the bore 32 and is shaped to match the shape of the key 50. The sprocket 30 fits around the central circular portion 11 of the shaft 10 over the key 50, whose dimensions are sufficient to allow it to reside partly in the groove 15 of the shaft and partly in the aligned slot 37 in the sprocket 30. The registered engagement provided by the key 50 between the sprocket 30 and the shaft 10 permits the rotational force of one to be transmitted to the other. Thus, for round bore sprockets, the key 50 is important in preventing the sprocket from slipping circumferentially as the shaft rotates.

Figure 7:
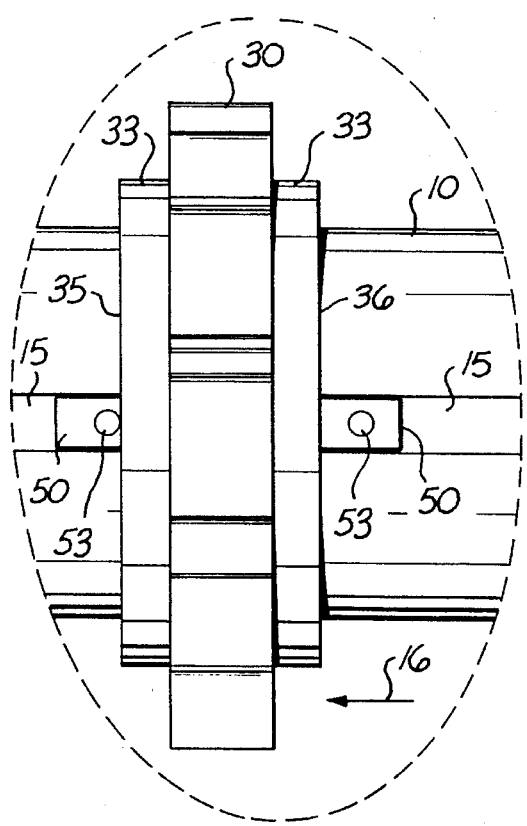
FIG. 7 is an expanded elevational view of a portion of the drive apparatus of FIG. 2.

The key 50 can also serve as a locking key to secure a sprocket 30 in a fixed position on the shaft 10. As shown in FIGS. 4–8, the key 50 includes a threaded hole 51 at each end 52 extending from a first surface 55 to an opposite second surface 56. Each of the threaded holes 51 is threadably engaged by a set screw 53, as shown in FIG. 9. Because the key 50 is preferably longer than the bore 32, the ends 52 of the body of the key 50 extend outward beyond the sides 35, 36 of the sprocket 30. As the screw 53 is tightened, it extends past the first surface 55 of the key body 50 and applies a force against the bottom of the groove 15 in the shaft 10 as shown in FIG. 8B. The force is adjustable by turning the screws 53. The head ends 54 of the set screws 53 are accessible from the second surface 56 of the key 50 opposite the first surface 55 facing the bottom of the groove 15. As the screws 53 are tightened, the body of the key 50 is elevated outwardly in the groove 15 to press deeper inwardly into the slot 37 in the sprocket 30 to prevent movement of the key 50 along the shaft 10. Because the set screws 53 tend to bite into the shaft material as they are tightened, they engage the shaft more positively than the relatively smooth surfaces of the key 50 engage the walls of the slot 37. Consequently, although the pressure of the key 50 against the sprocket 30 is sufficient to keep the sprocket from sliding along the key in many operating conditions, it is possible for the sprocket to slide along the key if the lateral forces are great enough. Movement of the sprocket 30 along the key 50, however, is restricted by the head ends 54 of the set screws 53. With the screw holes 51 spaced apart on the key 50 by a distance only slightly greater than the length of the bore 32 of the sprocket 30, the head ends 54 of the set screws 53 act as stop members that engage the sides 35, 36 of the sprocket 30, locking it in place on the shaft 10. In this way, the key 50 serves as a locking key for securing a sprocket 30 in a desired location along a shaft 10. With the screw holes 51 spaced more widely, the sprocket 30 has some leeway to slide along the immobilized key 50. Sliding could also be inhibited by an increase in the frictional contact between the sprocket 30 and the key 50. For example, knurling or otherwise adding a rough texture to the second surface 56 of the key 50 would be a way of increasing the friction. Because the screws 53 must be tightened fairly securely, especially for heavy loads, to lock the sprocket 30 in place, the stresses on the threads in the holes 51 of the key 50 can be severe. Consequently, the key is preferably made of a durable material, such as metal, for heavily loaded applications. In this way, the threads are less likely to strip, as often occurs with conventional plastic sprockets through which bolts or screws are tightened against the shaft.

To prevent the set screws from backing out and falling into the product or being lost, a commercial thread sealant can be applied to the threads in the holes 51 engaged by the set screws 53. Alternatively, as illustrated by FIG. 9, the holes 51 in the key body may be threaded along only part of their lengths, with an unthreaded recess 57 provided near the first surface 55 of the key body 50. The set screw 53 may correspondingly be threaded only along part of its length to form an unthreaded end portion 58 opposite its head end 54. The screws 53 can be inserted into the body 51 through the first surface 55, as indicated by arrow 59, before the keys 50 are installed in the groove 15. The unthreaded portions prevent the screws 53 from backing all the way out of the holes 51. With the key 50 in place on the shaft 10 under the sprocket 50, the screws 53 are captivated and cannot fall out. Of course, there are other ways to prevent the screws from backing out, such as deforming the threads or broadening the bottom end of the screw.

Figure 8A:
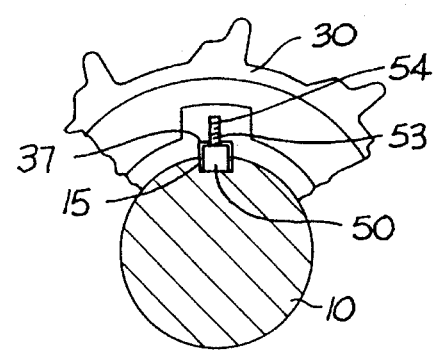
FIG. 8A is a partial cross-sectional view of the drive apparatus of FIG. 2 taken along cut line 8—8 of FIG. 2 with the key unlocked.
Figure 8B:
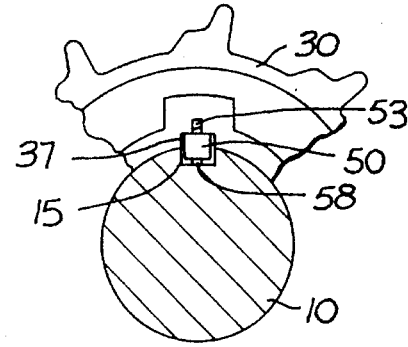
FIG. 8B is a partial cross-sectional view as in FIG. 8A, except with the key locked.
Figure 9:
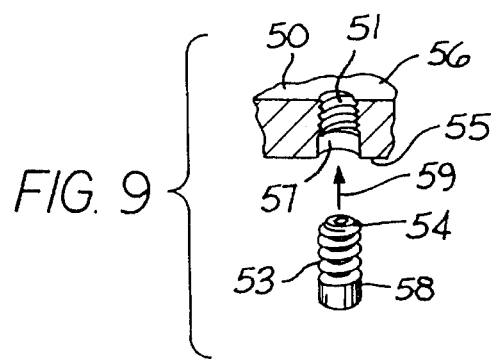
FIG. 9 is an exploded perspective view, partly in cross-section, of a version of set screw and key usable in the conveyor apparatus of FIG. 1.

The force applied by the set screw 53 against the shaft 10 and by the key body 50 against the sprocket 30 can be adjusted from a maximum force locking the sprocket in position to zero force, as illustrated in FIG. 8A. With the set screws retracted into the threaded holes 51, no force is applied and the sprocket 30 and key 50 are free to float along the shaft 10. The head end 54 of the set screw 53 extends outwardly of the second surface 56 of the key body 50 by an amount sufficient to contact the corresponding side 35 or 36 of the unlocked sprocket 30 as it slides along the shaft 10. As illustrated in FIG. 7, the sprocket 30 sliding along the shaft 10 in the direction of arrow 16 contacts the set screw 53 on the first side 35 of the sprocket and drags the key body 50 along the shaft. Thus, the extended portion of the set screw 53 serves as a draghand member. In this way, a sprocket 30 allowed to float is able to retain its key 50 in position to prevent rotational slippage and to permit the sprocket to be locked at some later time should that become desirable. Thus, as shown in FIG. 2, a common drive configuration is set by adjusting the set screws 53 of the middle sprocket 30 to apply maximum force to lock it in place and keep the belt aligned in the conveyor while adjusting the set screws of the other sprockets to apply no force to allow those sprockets to float and adapt to the variation of the belt width.

Although the invention has been described in detail with reference to a preferred version, other versions are possible. For example, the shape of the key body could be other than parallelepipedic. Furthermore, for use with non-circular shafts in which the sprocket inherently rotates with the shaft, the shaft may be grooved and fitted with a locking key that presses directly against the bore wall of the sprocket, there being no need for the slot along the sprocket bore. Therefore, the spirit and scope of the appended claims should not be limited to the description of the preferred version contained herein.

What is claimed is:

1. A drive apparatus for a conveyor belt comprising:
   a rotatable shaft having a groove along the length of its outer surface;
   a drive member for transmitting a drive force between the shaft and a conveyor belt, the drive member having a central bore wall defining a bore extending through the drive member from a first side to a second side to accommodate the shaft; and
   a key having a body shaped to tit loosely in the groove in the shaft and comprising a force-applying member disposed at each end of the body for applying a force against the shaft and pressing the body against the drive member to prevent movement of the drive member and the body along the shaft.

2. The drive apparatus of claim 1 wherein the drive member is a sprocket.

3. The drive apparatus of claim 1 wherein the key comprises a bar having a length greater than the length of the bore of the sprocket.

4. The drive apparatus of claim 1 wherein the force-applying member can apply an adustable force ranging from zero force to a maximum force, the force-applying member comprising a draghand portion extending outwardly from the body of the key when the adjustable force is zero, the draghand portion engaging the drive member as it moves along the shaft and dragging the key along the shaft with the drive member.

5. The drive apparatus of claim 1 wherein the drive member is loosely mounted on the shaft along the key.

6. The drive apparatus of claim 1 wherein the force-applying member can apply an adjustable force against the shaft.

7. The drive apparatus of claim 1 wherein the shaft is substantially circular in cross-section.

8. The drive apparatus of claim 1 wherein the bore wall of the drive member further forms a slot extending from the first side to the second side of the drive member and the key further fits partly in the slot to rotate the drive member with the shaft.

9. The drive apparatus of claim 8 wherein the force-applying member elevates the body outwardly in the groove of the shaft and inwardly into the slot in the drive member as the applied force is increased.

10. The drive apparatus of claim 8 wherein the body of the key extends through the slot in the bore wall beyond the first and second sides of the drive shaft and wherein the force-applying member at each end of the body is outside of the slot.

11. The drive apparatus of claim 8 wherein the body of the key is substantially parallelepipedic in shape and wherein the groove and the slot are substantially rectangular in cross-section.

12. The drive apparatus of claim 1 wherein the body of the key includes a first surface adjacent the bottom of the groove in the shaft and wherein the body is formed with a threaded hole extending through each end of the body from the first surface to a second opposite surface of the body and wherein the force-applying member comprises a set screw threadably engaged in each threaded hole for applying an adjustable force against the shaft, the adjustable force ranging from a maximum force pressing the body against the drive member to prevent movement of the drive member and the body along the shaft to zero force allowing the drive member and the loosely fitting body to move along the shaft.

13. The drive apparatus of claim 12 wherein, with the set screw in each hole adjusted to apply zero force, the set screw at each end extends outwardly of the second surface of the body of the key by an amount sufficient to contact the first and second sides of the drive member as it slides laterally along the shaft to drag the body of the key along the shaft with the drive member.

14. The drive apparatus of claim 12 wherein the threaded hole at each end of the body is threaded along only a portion of its length and the set screw is threaded along only a portion of its length to prevent the set screw from backing completely out of the second surface.

15. The drive apparatus of claim 1 wherein the force-applying member comprises a stop portion extending outwardly from the body of the key for engaging the first and second sides of the drive member to restrict the lateral movement of the drive member along the body.

16. A conveyor apparatus, comprising:

first and second rotatable shafts, at least the first shaft having a groove along the length of its outer surface;

a plurality of drive members mounted on the shafts for rotating therewith;

an endless conveyor belt extending around and engaging the drive members;

at least one of the drive members on at least the first shaft having a central bore wall defining a bore extending through the drive member from a first side to a second side to accommodate the shalt; and a key having a body shaped to fit loosely in the groove in the shaft and comprising a force-applying member disposed at each end of the body for applying a force against the shaft and pressing the body against the drive member to prevent movement of the drive member and the body along the shaft.

17. The conveyor apparatus of claim 16 wherein the bore wall of the drive member further forms a slot extending from the first side to the second side of the drive member and the key further fits partly in the slot to rotate the drive member with the shaft.

18. A locking key assembly for use in a belt conveyor in which a drive member having a central bore wall is mounted on a shaft having an axial keyway, comprising in combination:

a key shaped to fit loosely in the keyway in the shaft; and a force-applying member disposed at each end of the key body for applying a force against the shaft and pressing the key body against the bore wall of the drive member to lock the drive the member in a fixed position along the shaft.

19. The locking key assembly of claim 18 wherein the key body forms a threaded hole at each end and wherein the force-applying member comprises a set screw threadably engaged in each hole to apply an adjustable force against the bottom of the keyway to press the key body against the bore wall of the drive member.

* * * * *

UNITED STATES PATENT AND TRADEMARK OFFICE
CERTIFICATE OF CORRECTION

PATENT NO    : 5,518,109
DATED        : May 21, 1996
INVENTOR(S)  : Dailey et al.

It is certified that error appears in the above-identified patent and that said Letters Patent is hereby corrected as shown below:

```
          Column 2, Line 29; change "shalt" to --shaft--.
          Column 2, Line 31; change "shalt" to --shaft--.
          Column 2, Line 34; change "shalt" to --shaft--.
          Column 2, Line 47; change "shalt" to --shaft--.
          Column 2, Line 50; change "shalt" to --shaft--.
          Column 2, Line 53; delete the period "." after "conveyed".
Column 6, Claim 1, Line 30; change "tit" to --fit--.
Column 8, Claim 16, Line -9; change "shalt" to --shaft--.
          Claim 18, Line 25; insert --body-- between "key" and "shaped".
          Claim 18, Line 29; delete "the" between "drive" and "member".
```

Signed and Sealed this

Twentieth Day of August, 1996

Attest:

BRUCE LEHMAN

Attesting Officer    Commissioner of Patents and Trademarks